Oct. 31, 1967    R. B. ALEXANDER    3,349,541
METHOD AND APPARATUS FOR HANDLING AND PLACING
TILE BODIES IN PRECISE LOCATIONS
Filed May 13, 1964    7 Sheets-Sheet 1

INVENTOR.
R. B. Alexander
BY Robb & Robb
Attorneys

Oct. 31, 1967  R. B. ALEXANDER  3,349,541
METHOD AND APPARATUS FOR HANDLING AND PLACING
TILE BODIES IN PRECISE LOCATIONS
Filed May 13, 1964  7 Sheets-Sheet 2

INVENTOR.
R. B. Alexander
BY Robb & Robb
Attorneys.

United States Patent Office
3,349,541
Patented Oct. 31, 1967

3,349,541
METHOD AND APPARATUS FOR HANDLING AND PLACING TILE BODIES IN PRECISE LOCATIONS
Richard B. Alexander, Anderson, Ind., assignor to National Tile & Manufacturing Co., Anderson, Ind.
Filed May 13, 1964, Ser. No. 367,104
10 Claims. (Cl. 53—55)

This invention relates to the mounting of separate tile bodies in the tile receiving recesses of a tile mounting board, and more particularly, the invention provides a novel apparatus and method for so mounting the tile bodies in such a tile mounting board entirely automatically.

It is common practice today to furnish ceramic floor tile in units consisting of a plurality of tile bodies mounted to a backing sheet, the tile bodies being arranged in uniformly spaced relation in rows to form a rectangular unit several tile rows wide. One such standard unit, for example, consists of twelve parallel rows of one inch square tiles with 24 tiles in each row providing a unit slightly larger than 12 inches wide by 24 inches long, allowing for the uniform spacing of the tile bodies on the backing sheet to permit entry of grout between the tile bodies when such units are laid in the usual manner to provide a tile floor.

The practice of providing such units consisting of a plurality of tile bodies secured to a backing sheet obviously makes for convenience and efficiency of handling tile, particularly for the purposes of the tile laying operation and it enables the tile bodies to be mounted to the backing sheet in a suitable variety of pre-determined patterns including tiles of different colors in the pattern.

Prior methods of providing such units consisting of a plurality of tile bodies mounted to a backing sheet have involved hand placing of the tile bodies in a tile board having a plurality of uniformly spaced recesses for receiving the individual tile bodies which are arranged on the board in the desired pattern after which the backing sheet is glued to the surfaces of the tile bodies protruding from the recesses in the board.

The principal object of the invention therefore is to provide a method and apparatus for placing the tile bodies in the recesses of a tile mounting board in an entirely automatic manner and such that the patterns in which the tiles are arranged may be varied in any desired manner.

To the foregoing end, the present invention contemplates the provision of apparatus consisting of conveyor means for moving tile mounting boards, one after another, to a station at which tile bodies are placed on the board, means for conveying the tile bodies to such station, and means for placing the tile bodies individually in the recesses in the tile boards as the latter are moved by conveyor means to and beyond said station.

Other objects, advatnages and features of the invention will appear more fully from the following detailed description, taken in conjunction with the accompanying drawings in which.

Figures 1, 7, 8:
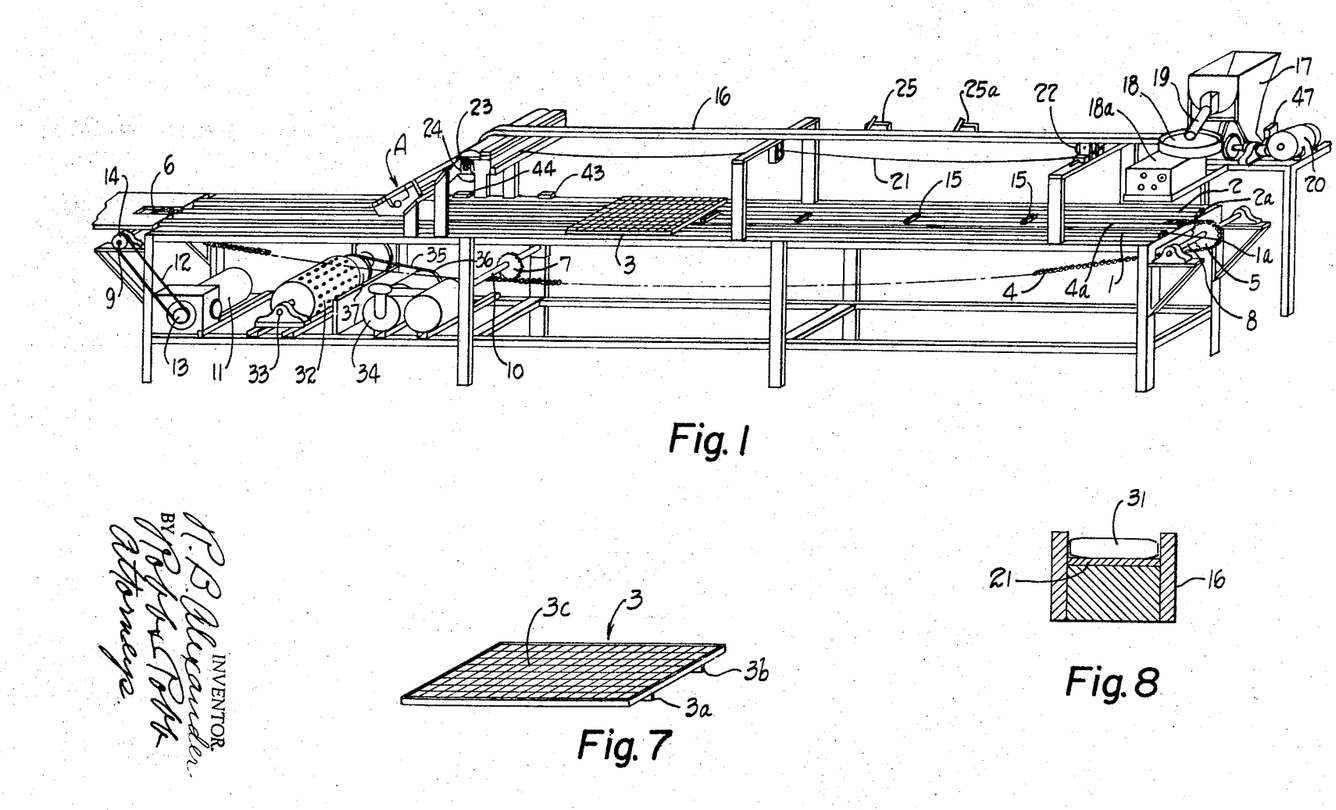
FIGURE 1 is a perspective view of apparatus embodying the invention.
FIGURE 7 is a perspective view of the tile mounting board.
FIGURE 8 is a vertical section through the feed track.

Now referring to the drawings and describing the invention in detail, the apparatus shown in the drawings comprises a suitable framework upon which the various instrumentalities are mounted. A pair of horizontally disposed guide tracks 1 and 2 is mounted on said framework, said guide tracks being provided with longitudinally extending grooves 1a and 2a to receive the correspondingly spaced guide flanges 3a and 3b of a tile mounting board so-called, designated 3. The said tile mounting board, which is usually made of wood with steel reinforcing, is provided with a plurality of uniformly spaced shallow recesses 3c for receiving individual tile bodies so that when the latter are properly located therein the upper surfaces of the tile bodies protrude from the recesses above the upper surface of the tile mounting board.

Conveyor means is provided for moving the tile mounting boards 3, one after another, along the guide tracks 1 and 2 leftwardly, having reference to FIGURE 1, to and beyond the tile depositing station generally indicated by the letter A at which the individual tile bodies are deposited in respective recesses 3c of a tile board moving thereunder. Said conveyor means comprises an endless chain 4 running over sprockets 5, 6 and under but in tension contact with sprocket 7 fixed to respective shafts 8, 9 and 10, each of which is journaled rotatably in suitable end bearings. The upper reach of chain 4 runs in a track 4a. The driven shaft 9 rotated counterclockwise (FIGURE 1) is powered from a suitable gear-head electric motor 11 through an endless belt 12 running over a pulley 13 fixed to the motor drive shaft and a pulley 14 fixed to the driven shaft 9. Thus shaft 10 is also rotated counterclockwise by chain 4. Lugs 15 are secured at suitable intervals to the endless chain 4 for engaging the tile mounting boards 3 to move the same along the guide tracks 1 and 2.

The recesses 3c in the tile mounting boards 3 are arranged in laterally spaced parallel rows extending longitudinally of the direction of travel of the mounting boards 3 along the tracks 1 and 2. For example, such a mounting board 3 may be provided with twelve laterally spaced rows of said recesses, each row having 24 recesses spaced longitudinally of the direction of travel of said mounting board.

Tile body supplying means is provided for supplying the individual tile bodies to the tile deposit station A. As shown in the accompanying drawings, such tile body supplying means may include a plurality of feed tracks such as that indicated by the numeral 16 suitably supported on the framework above the tracks 1 and 2, each such feed track 16 terminating as a downwardly inclined gravity feed magazine 16a at the tile deposit station A. While, for purposes of clarity only one such feed track has been shown in the drawings, it will be understood that a plurality of said tile feed tracks will be provided, one tile feed track for each longitudinal row of tiles to be deposited in the recesses of the mounting boards 3, speaking of the longitudinal rows extending longitudinally of the direction of travel of the mounting board. Thus in the case of the exemplary tile mounting board above mentioned, the tile body supplying means would comprise twelve of the feed tracks 16, each terminating in a gravity feed magazine 16a disposed with its respective terminal end just above and aligned with a respective one of the laterally spaced rows of longitudinally disposed recesses in the tile mounting board 3.

For supplying tile bodies to the tile feed tracks 16 there is provided a respective hopper feeder 17 and a respective vibratory feeder 18. Thus in the case of the use of the exemplary tile mounting board referred to, the apparatus hereof will include twelve hopper feeders 17 and twelve vibrating feeders 18. Each hopper feeder 17 has feeding mechanism in the bottom thereof which picks up approximately 24 pieces of tile body and dispenses them through a chute 19 to the vibrating feeder 18. The feeding mechanism in the hopper 17 is driven by a motor 20 under the control of a clutch operated by a limit switch 46 so as to control the flow of tile into the vibrating feeder 18 since, if there is a surplus of tile in the latter, it will not feed properly.

The tile bodies are fed from the vibrating feeder to the feed track 16. The tile bodies are moved along the track 16 by means of an endless belt 21 which passes over a pulley 22 fixed to a shaft rotatably journaled in bearings located adjacent the supply end of the track 16. The upper reach of the belt 21 runs in the track 16 and passes over a pulley fixed to a driven shaft 23 rotatably journaled in end bearings 24 adjacent the tile depositing station A, the shaft 23 being driven by an endless chain (not shown) passing around sprockets (not shown) on the respective shafts 10 and 23. Thus, through the means just mentioned, the motion of endless chain 4, by rotating shaft 10, imparts similar motion to endless belt 21.

Each track 16 is provided with a limit switch 25 and 25a controlling operation of the motor 18a which operates the vibrating feeder 18. When tile is under both limit switches 25 and 25a in the track 16, the motor 18a will shut off so as to stop operation of the vibrating feeder 18 which will then no longer supply tile bodies to the track 16. If the tile bodies have traveled under and past the limit switch 25 leaving the track under that limit switch empty, the motor 18a will start so as to operate the vibrating feeder 18 to deliver tile bodies to the track 16 until tile is under both limit switches 25 and 25a. The belt 21 runs continuously so that so long as there are tile bodies in the track 16 they will be moved along said track from the feed end thereof toward the tile depositing station A.

Figure 2:
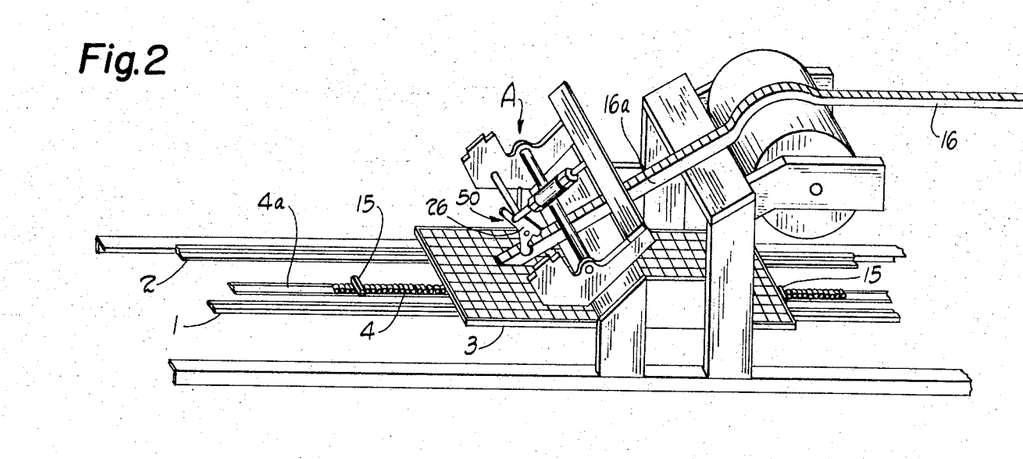
FIGURE 2 is a detailed perspective view of a portion of the apparatus showing more particularly the gravity feed magazine and the release holding mechanism.
Figure 5:
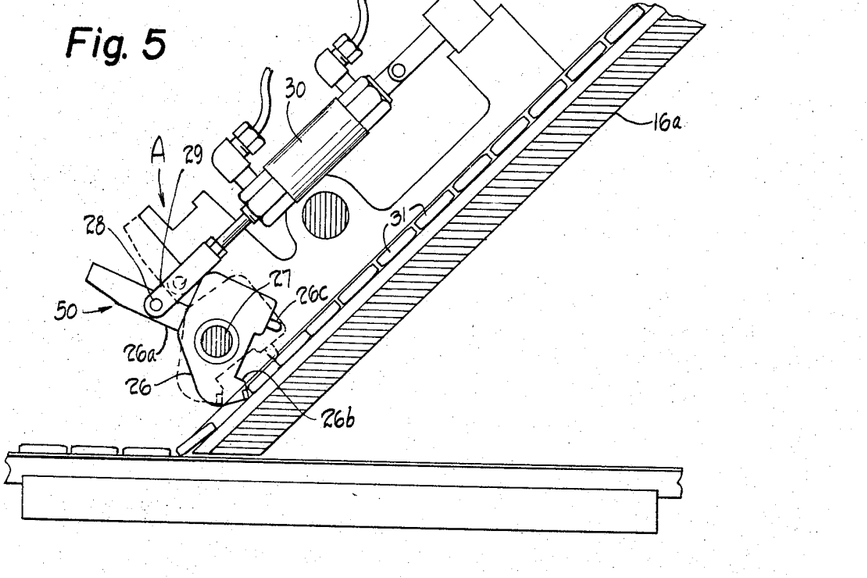
FIGURE 5 is an enlarged detail view in side elevation of the said release holding mechanism.

For controlling the discharge of tile bodies from the gravity feed magazine 16a, a release-holding mechanism generally designated by the numeral 50 is provided for each gravity feed magazine 16a at the tile depositing station A. The release-holding mechanism comprises a lever 26 fixed to a shaft 27 rotatably journaled in suitable side bearings, the lever 26 having a lever arm 26a pivoted as at 28 to a link 29 secured to the piston of an air motor 30.

The lever 26 has a forwardly disposed holding finger 26b which, in the normal full line position of the lever shown in FIGURE 5, engages in front of the leading edge of the lowermost tile body in the respective gravity feed magazine 16a, the tile bodies being designated 31. Thus in the normal position of the lever 26 the tile bodies are prevented from being discharged from the magazine 16a. When the air motor 30 is operated through actuating means hereinafter to be described, the lever 26 is rocked in a clockwise direction around the axis of the shaft 27 to the dotted line position indicated in FIGURE 5 serving to release the lowermost tile body 31 for discharge from the magazine 16a and causing the rubber tipped finger 26c of the lever 26 to immediately press down and hold the next higher tile body 31 momentarily whereafter the lever 26 is immediately rocked back to the normal full line position of FIGURE 5 causing the finger 26c to release the lowermost tile body 31 and permit it to move into holding engagement with the forwardly disposed holding finger 26b. Thus the operation of the air motor is such as to cause a short, fast double stroke of its piston to rock the lever from the full line position to the dotted line position and immediately back to the full line position of FIGURE 5.

Figure 3:
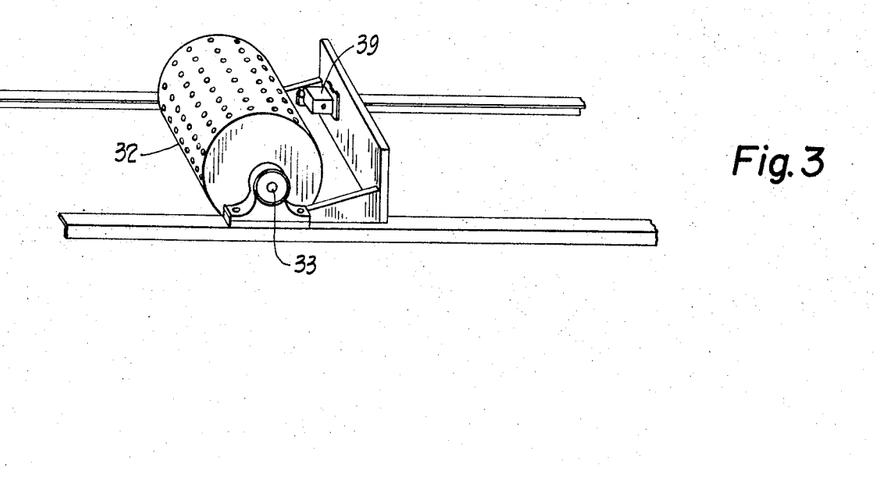
FIGURE 3 is a perspective view of a portion of the apparatus showing more particularly the actuating means for actuating the release holding mechanism.

The actuating means for initiating and controlling operation of the tile discharge mechanism will now be described. This actuating means includes a so-called memory drum 32, see FIGURES 1, 3 and 4. The memory drum 32 is fixed to a shaft 33 rotatably journaled in suitable end bearings and driven by a suitable electric motor and speed reducer 34 through a chain 35 passing over a sprocket 36 on the motor drive shaft and over a sprocket 37 fixed to the freely rotatable magnet coil housing 48a of electric clutch 48 the armature 48b of which is keyed to shaft 33. The drum 32 has a plurality of keys or plugs, one for each space or recess in the tile mounting boards 3 to be used with the apparatus. These plugs or keys 38 are arranged in laterally spaced circular series, each circular series of keys 38 corresponding with one of the laterally spaced rows of longitudinally disposed recesses of the mounting board 3.

Figures 4, 9, 10:
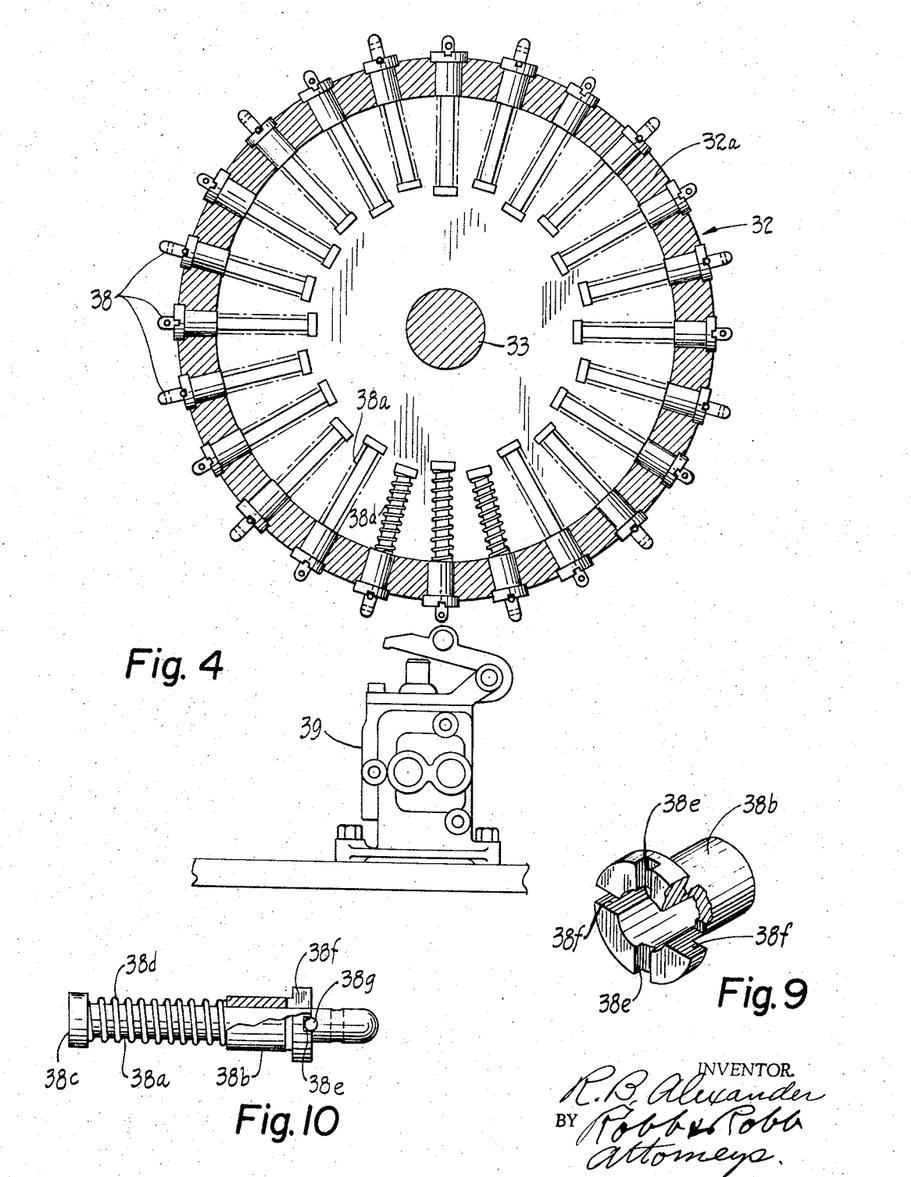
FIGURE 4 is an enlarged detailed view in side elevation of the said actuating means.
FIGURE 9 is a perspective view of one of the bushings for the keys of the actuating means of FIGURE 4.
FIGURE 10 is a view partly broken away and partly in section showing a bushing and one of the keys of said actuating means.

As the drum 32 rotates the protruding keys 38 will successively engage a respective pneumatic valve 39 to cause operation of the air motor 30 for effecting discharge of one tile 31 from the respective gravity feed magazine 16a. Thus there will be provided for use with the exemplary mounting board 3 above referred to twelve of the pneumatic valves 39, each aligned with a respective circular series of the plugs or keys 38 for controlling discharge of tile bodies from a corresponding gravity feed magazine 16a corresponding to and aligned with one of the laterally spaced rows of longitudinally disposed recesses in the mounting board 3. The keys 38 are constructed so that when any one of them is rotated 90 degrees it will be caused to be depressed radially inwardly of the drum so that it will not engage the respective pneumatic valve 39 during rotation of the drum 32.

For this purpose, each key 38 has a shank 38a received in a bushing 38b set into the peripheral rim 32a of drum 32. At the inner end of the shank 38a is head or abutment 38c. Encircling each shank is a respective compression spring 38d compressed between the head 38c and the inner face of said rim. Each bushing is provided with cross slots 38e and 38f to receive a pin 38g protruding laterally from the shank 38a. Slot 38e provides a shallow recess in the outer face of the bushing so that when a key 38 is rotated so that its pin 38g is received in this shallow recess the key protrudes from the drum to engage valve 39 during rotation of the drum. Slot 38f provides a deeper recess extending radially inwardly of the rim of the drum 32 so that when the key 38 is rotated so that pin 38g is received in this deeper recess, the said key is retracted and will not engage valve 39.

In the event that it is desired to leave particular recesses of the mounting board 3 empty, the key 38 corresponding to that recess will be deactivated in the manner above indicated. By deactivating desired keys 38 of the memory drum 32 certain recesses in the mounting board will not have a tile body deposited therein during operation of the apparatus. The purpose of this is to accommodate orders when specifications call for a small percentage of one, two or three different colors and a large percentage of a main color of tile. Thus the spaces or recesses of the mounting board left empty can be filled in later by hand or by another machine of the apparatus described herein to deposit in the unfilled recesses the tile bodies of the other colors. This capability of the apparatus and method of operation enables the tiles to be deposited on the mounting boards 3 in a variety of pre-determined desired patterns.

If the specification for the tile floor calls for certain percentages but not exact location of tiles of another color or colors different from the main color, this can be accomplished by placing the correct percentages of the other color tiles different from the main color in one or more of the various feed hoppers so that the correct percentages of the differently colored tiles would fall into place in a random pattern.

For purposes of producing other patterns of tile floor it will be obvious of course that each of the hoppers 17 will be filled with tile bodies of the particular desired color.

The aforesaid actuating means for initiating discharge of tile bodies from the magazines 16a further includes cam means designed to permit but a single revolution of the memory drum at any given time and control means are provided for controlling operation of the cam and of the drum so that tile bodies will be discharged from the magazines 16a only when a tile mounting board 3 is positioned in proper relation to the discharge ends of the said magazines 16a. The said cam means, see FIGURES 1 and 6, comprises a cam member 40 fixed to the memory drum shaft 33 rotatably journaled in a bearing 34a, and a cam lever pivoted at 41 and operably connected to a solenoid 42. The control means for controlling operation of the cam means, the memory drum, and hopper feeder 17 comprises the limit switches 43 and 44, solenoid 42, a switch 46 actuated by pin 40a on cam 40, and solenoid 47 located adjacent to and controlling operation of hopper feeder 17.

In the operation of the apparatus, it will be understood that the conveyor means comprising the endless chain 4 runs continuously so that whenever a mounting board 3 is placed on the tracks 1 and 2 it will be engaged by one of the lugs 15 and moved along said tracks toward and beyond the tile depositing station A. Also during the operation of the apparatus the belt 21 runs continuously so that suitable supplies of tile bodies will at all times be in the tracks 16 and the gravity feed magazines 16a.

The motor 34 runs continuously and, under control of the control means above referred, causes periodic rotation of the memory drum 32. Likewise, the motor 20 runs continuously and, also under the control of said control means, causes periodic feeding of tile bodies from hopper feeder 17 to vibrating feeder 18.

Figure 6:
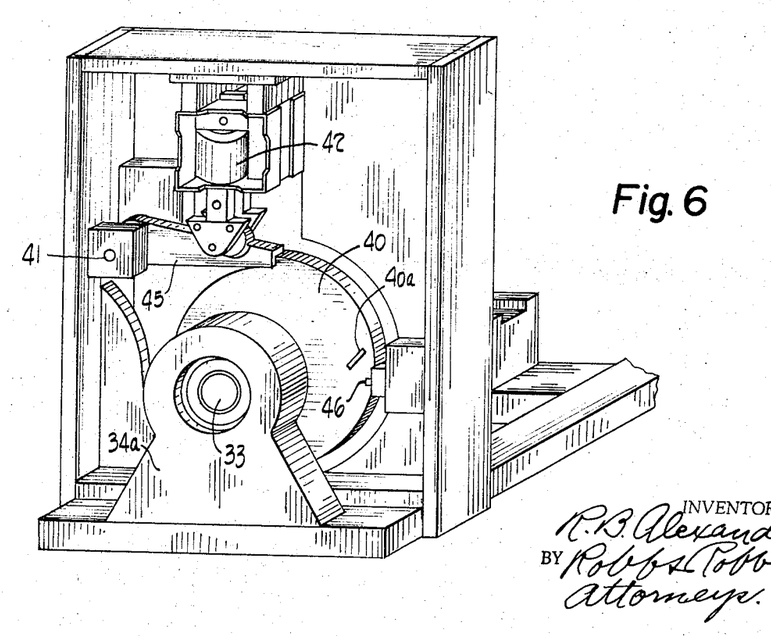
FIGURE 6 is a perspective view of the cam means forming part of the said actuating means.
Figure 11:
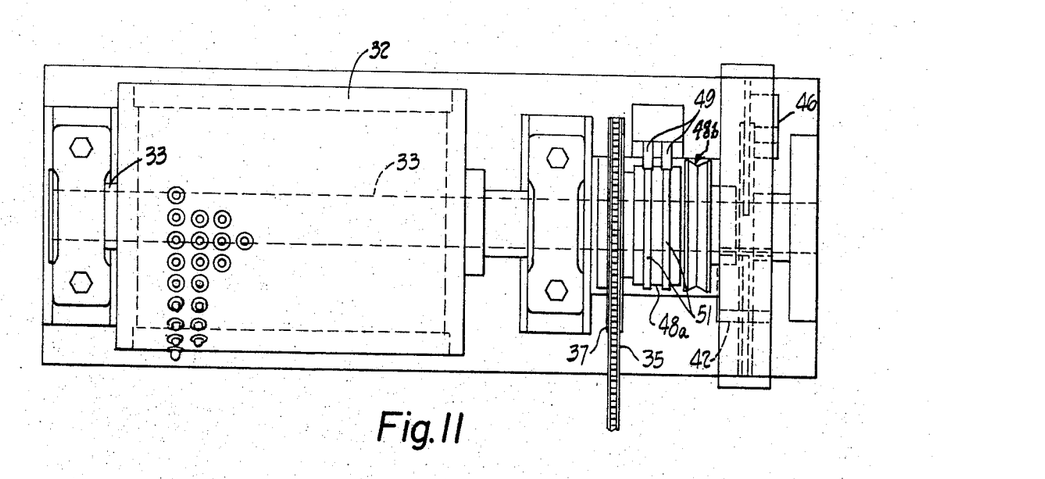
FIGURE 11 is a top plan view of said actuating means.
Figure 12:
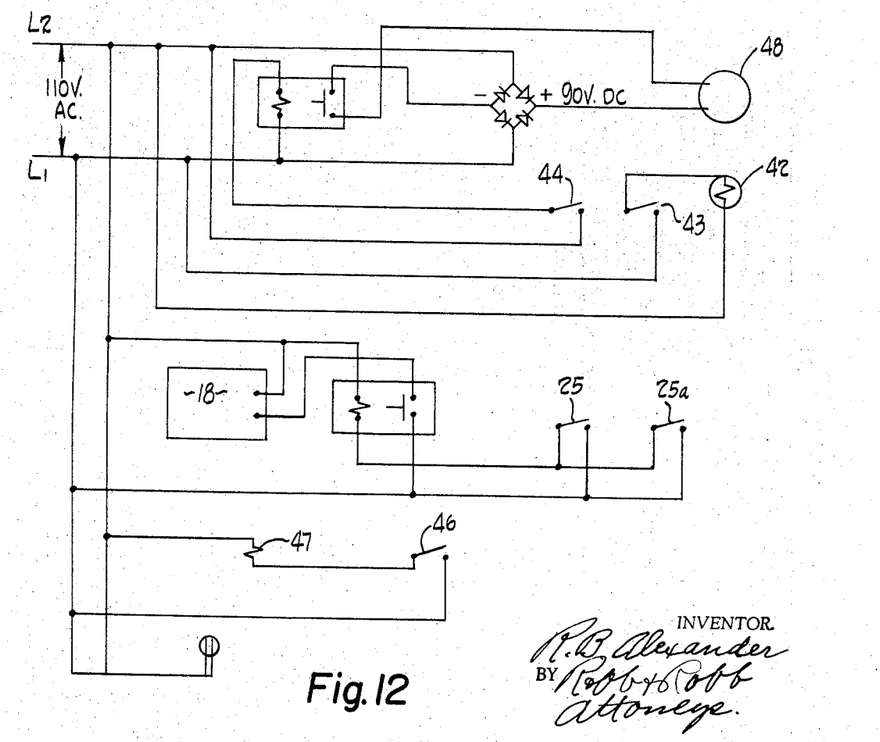
FIGURE 12 is a wiring diagram.
Figure 13:
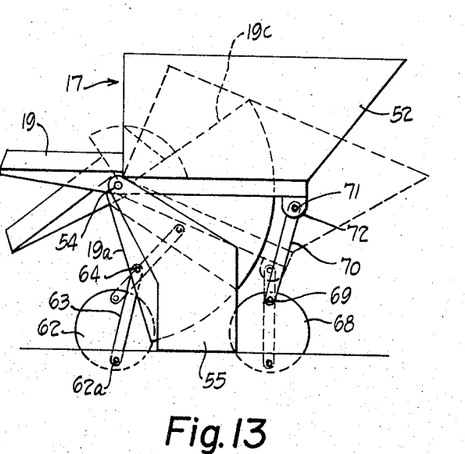
FIGURE 13 is a side elevation of the hopper feeder.
Figure 14:
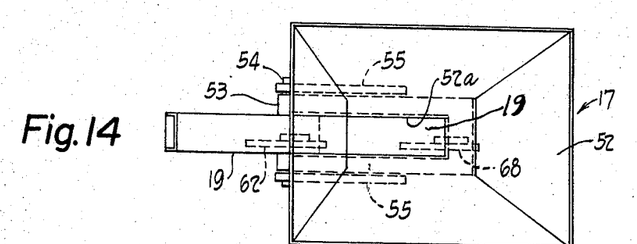
FIGURE 14 is a top plan view of the same.
Figure 15:
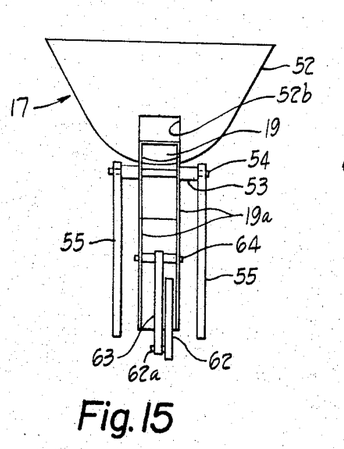
FIGURE 15 is a front elevation of the same.
Figure 16:
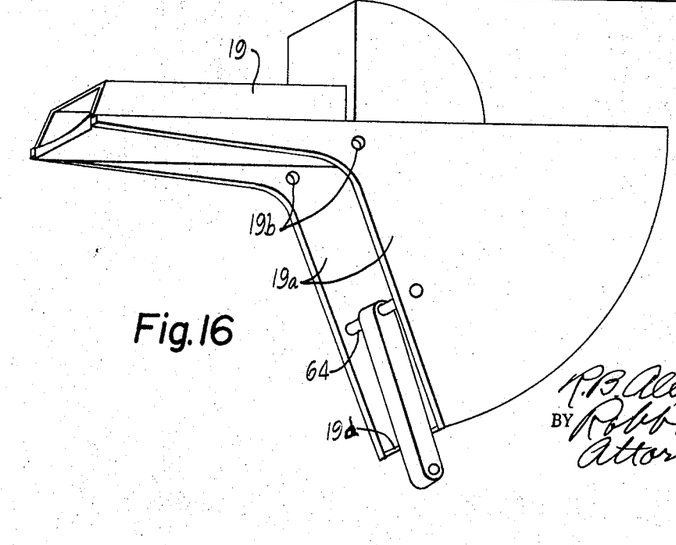
FIGURE 16 is a perspective view of the movable spout of the hopper feeder.

As the mounting board 3 moves along the tracks 1 and 2 (leftwardly, FIGURE 1), it first contacts the limit switch 43 and this actuates the solenoid 42 to rotate the cam lever 45 counterclockwise, having reference to FIGURE 6, so as to release the cam 40 for subsequent operation. As the mounting board 3 continues to move, it next contacts limit switch 44 which activates a one revolution electric clutch, allowing the drum 32 and cam 40 to be rotated one revolution by motor 34. The coil of said electric clutch 48 is energized by the closing of an electric circuit through limit switch 44 and brushes 49 engaging contact rings 51 on magnet coil housing 48a. When energized, the magnet coil draws armature 48b against housing 48a causing rotation of shaft 33, memory drum 32 and cam 40 by motor 34.

As cam 40 rotates, pin 40a thereon contacts and activates limit switch 46 causing solenoid 47 to be momentarily energized and thereby allowing single revolution mechanical clutch 57 to rotate one revolution. When tile mounting board 3 contacts limit switch 43, solenoid 42 remains energized until tile mounting board 3 passes and clears limit switch 43, thereby deenergizing solenoid 42. This allows lever 45 to fall by gravity and slide on the outer surface of cam 40 while said cam 40 is rotating counterclockwise until cam 40 rotates to the point of stop shown in FIGURE 6. Lever 45 therefore is allowed to fall by gravity into position to reengage cam 40 at the end of one complete single revolution.

When limit switch 46 energizes momentarily solenoid 47 which permits single revolution clutch 57 to rotate through one complete revolution powered by motor 20, said motion is transferred to hopper feeder 17 which dumps approximately two dozen tile units 31 through chute 19 from hopper feeder 17 into vibrating feeder 18. Since limit switch 46 only momentarily energized solenoid 47 and permitted single revolution clutch 57 to immediately commence its revolution, then when the revolution has been completed, single revolution clutch 57 is stopped and held in the stop position by lever 47a until solenoid 47 is actuated again by limit switch 46.

Rotation of the drum 32 actuates the pneumatic valves 39 which, in turn, effect operation of the air motors 30 to cause spaced discharge of tile bodies from the magazines 16a. In this connection it is noted that the time interval between successive actuations of the pneumatic valves 39 is coordinated with the travel rate of the mounting board under and past the discharge ends of the magazines 16a so that each such actuation of the valves 39 will cause deposit of a tile body in the particular recess in the mounting board which corresponds to a particular key 38 of the drum 32. The said time interval is regulated by the circumferential spacing of successive keys 38 of each circular series.

As shown in greater detail in FIGURES 13 thru 17 inclusive, the hopper feeder 17 comprises a hopper 52 having a bottom opening 52a communicating with a front opening 52b within which the spout unit 19 is disposed and arranged for pivotal movement relative to the hopper 52. The hopper 52 has integrally secured to the bottom thereof a bracket 53 the forward end of which is pivoted by means of a pivot pin 54 to the stationary frame parts 55 so that the hopper 52 is pivotally movable to and from the full line and dotted line positions of FIGURE 13 around the axis of the pin 54. The spout unit 19 includes a pair of spaced integral brackets 19a having apertures 19b therein through which the pivot pin 54 passes so that the spout unit 19 is likewise pivotally mounted on said pin for pivotal movement relative to the stationary frame parts 55. The spout unit 19 has a trough bottom extension 19c which extends between the brackets 19a and rearwardly to the arcuate closure plate 19d also integrally secured to and extending between the brackets 19a. In the normal full line position of FIGURE 13, the spout is approximately horizontal with the trough bottom extension 19c likewise horizontal and level with the bottom of the hopper 52 so as to close the bottom opening 52a thereof.

Figure 17:
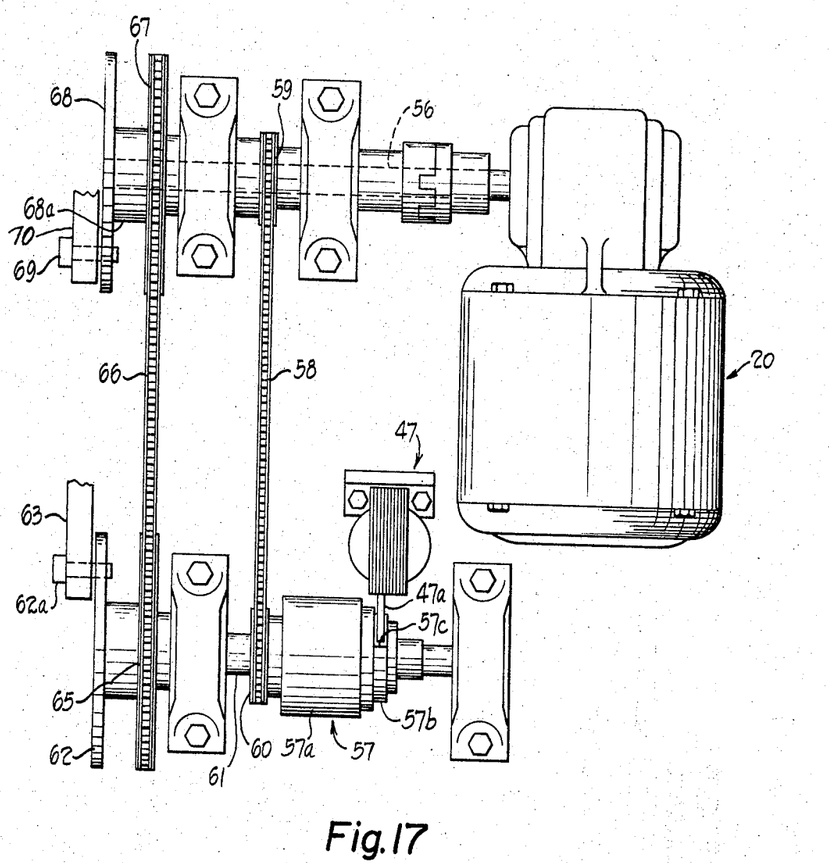
FIGURE 17 is a top plan view of the operating mechanism for the hopper feeder.

Operating means shown more particularly in FIGURE 17 is provided for causing periodic pivotal movement of the spout unit 19 and the hopper 52 around the pivotal axis of the pivot pin 54. Said operating mechanism comprises the gear head motor 20 which drives a shaft 56 which in turn causes rotation of the housing 57a of an over-running clutch 57 through chain 58 running over a sprocket 59 fixed to shaft 56 and over a sprocket 60 fixed to the clutch housing 57a. The inner relatively rotatable hub part 57b is fixed to shaft 61 and would normally be rotated by rotation of the housing 57a except that means is provided for normally holding the hub portion 57b stationary so that the housing 57a over-runs or rotates relatively to the hub 57b. The hub 57b is provided with an abutment face 57c which normally abuts with the stem 47a of the solenoid 47 so as to prevent rotation of the shaft 61 so that the clutch housing 57a normally rotates without effecting rotation of shaft 61.

Fixed to shaft 61 is a disc 62 having an eccentric pin 62a pivotally connected to a lever 63 which in turn is pivotally connected to a pivot pin 64 extending between the brackets 19a of the spout unit 19. Also fixed to the shaft 61 is a sprocket 65 over which runs a chain 66 which in turn runs over a sprocket 67 fixed to the hub 68a of a disc 68 which idles on shaft 56. The disc 68 has an eccentric pin 69 pivotally connected to a lever 70 which in turn is pivotally connected by a pivot pin 71 to a bracket 72 integral with the hopper 52.

As above indicated, whenever the switch 46 is actuated this energizes solenoid 47 momentarily so that the stem or lever 47a thereof is withdrawn from abutting engagement with the abutment portion 57c of the hub of the clutch 57 permitting the clutch housing 57a, hub 57b and shaft 61 to rotate as a unit for one revolution. As soon as pin 40a passes switch 46 the latter is deactivated and solenoid 47 is immediately deenergized permitting plunger stem 47a to reengage and follow hub 57b until the revolution is complete when the stem 47a again engages the abutment face 57c, thereby stopping rotation of shaft 61. During the single revolution of the shaft 61, the discs 62 and 68 are rotated through the chain 66 and this serves to rotate the spout unit 19 counter-clockwise to the dotted line position of FIGURE 13 to discharge approximately two dozen tile bodies from the hopper feeder 17 to the vibrating feeder 18. At the same time, the hopper 52 was rotated in a clockwise direction to the dotted line position of FIGURE 13 thereby retaining in the hopper all of the loose tiles except those which are picked up by the trough bottom 19c for discharge through the spout.

Thus every time that the memory drum 32 is rotated one revolution serving to discharge tiles from the gravity feed magazines 16a to fill the recesses in the tile mounting board 3 as it passes the tile depositing station A, the operating mechanism for the hopper feeder 17 is simultaneously actuated to discharge about the same number of tile bodies into the vibrating feeder 18.

It will be understood that the vibratory feeder 18 is a standard type feeder such as that known by the trade name "Elkomatic" manufactured by Elk Engineering Works, Saint Marys, Pennsylvania, being of the type comprising a bowl having a peripheral spiral track into which the tile bodies are introduced by the vibratory action and as the bowl rotates the tile bodies are lifted and successively fed to the feed track 16.

I claim:

1. In apparatus for placing tile bodies in the recesses of a tile mounting board, in combination, means for moving a tile mounting board toward and past a tile depositing station, tile depositing means at said station and disposed above and aligned with the travel path of particular recesses in such mounting board as the latter is moved by said moving means, means for effecting discharge of tile bodies from said depositing means, and actuating means for actuating said means for effecting discharge, said actuating means being coordinated with and controlled by the travel movement of such board when so moved, wherein the tile depositing means comprises a gravity feed magazine, and the means for effecting discharge comprises release-holding mechanism operable by said actuating means to discharge a tile body from said magazine and deposit such discharged tile body in a particular recess of said mounting board, said release-holding mechanism comprising a pivoted lever having a holding finger normally engageable with the lowermost tile in said magazine to prevent discharge of tiles therefrom, said lever having a second holding finger and being moveable to and from a position engaging the second holding finger with the next upwardly disposed tile in said magazine to prevent discharge of the other tiles therefrom while releasing the first finger from engagement with said lowermost tiles to permit discharge thereof and wherein said actuating means comprises a rotatable drum having a plurality of keys protruding from the periphery thereof, each key corresponding to a respective recess in said mounting board in which a tile body is to be deposited, each key being operable for selective activation and deactivation, and an instrumentality engageable with each actuated key and operable to actuate said discharge means to deposit a tile body in said corresponding recess during travel movement of said board.

2. In apparatus for placing tile bodies in the recesses of a tile mounting board, in combination, means for moving a tile mounting board toward and past a tile depositing station, tile depositing means at said station and disposed above and aligned with the travel path of particular recesses in such mounting board as the latter is moved by said moving means, means for effecting discharge of tile bodies from said depositing means, and actuating means for actuating said means for effecting discharge, said actuating means being coordinated with and controlled by the travel movement of such board when so moved, wherein the tile depositing means comprises a gravity feed magazine, and the means for effecting discharge comprises release-holding mechanism operable by said actuating means to discharge a tile body from said magazine and deposit such discharged tile body in a particular recess of said mounting board, said release-holding mechanism comprising a pivoted lever having a holding finger normally engageable with the lowermost tile in said magazine to prevent discharge of tiles therefrom, said lever having a second holding finger and being moveable to and from a position engaging the second holding finger with the next upwardly disposed tile in said magazine to prevent discharge of the other tiles therefrom while releasing the first finger from engagement with said lowermost tiles to permit discharge thereof and wherein the actuating means comprises control means operable by said board during travel movement thereof to initiate operation of said actuating means.

3. In apparatus for placing tile bodies in the recesses of a tile mounting board, in combination, means for moving a tile mounting board toward and past a tile depositing station, tile depositing means at said station and disposed above and aligned with the travel path of particular recesses in such mounting board as the latter is moved by said moving means, means for effecting discharge of tile bodies from said depositing means, and actuating means for actuating said means for effecting discharge, said actuating means being coordinated with and controlled by the travel movement of such board when so moved, wherein said actuating means comprises a rotatable drum having a plurality of keys protruding from the periphery thereof, each key corresponding to a respective recess in said mounting board in which a tile body is to be deposited, each key being operable for selective activation and deactivation, and an instrumentality engageable with each activated key and operable to actuate said discharge means to deposit a tile body in said corresponding recess during travel movement of said board, wherein the actuating means comprises control means operable by said board during travel movement thereof to initiate operation of said actuating means, wherein the tile depositing means comprises a gravity feed magazine, and the means for effecting discharge comprises release-holding mechanism operable by said actuating means to discharge a tile body from said magazine and deposit such discharged tile body in a particular recess of said mounting board, said release-holding mechanism comprising a pivoted lever having a holding finger normally engageable with the lowermost tile in said magazine to prevent discharge of tiles therefrom, said lever having a second holding finger and being moveable to and from a position engaging the second holding finger with the next upwardly disposed tile in said magazine to prevent discharge of other tiles therefrom while releasing the first finger from engagement with said lowermost tile to permit discharge thereof.

4. In apparatus for placing tile bodies in the recesses of a tile mounting board, in combination, means for moving a tile mounting board toward and past a tile depositing station, tile depositing means at said station and disposed above and aligned with the travel path of particular recesses in such mounting board as the latter is moved by said moving means, means for effecting discharge of tile bodies from said depositing means, and actuating means for actuating said means for effecting discharge, said actuating means being coordinated with and controlled by the travel movement of such board when so moved, wherein the tile depositing means comprises a gravity feed magazine, and the means for effecting discharge comprises release-holding mechanism operable by said actuating means to discharge a tile body from said magazine and deposit such discharged tile body in a particular recess of said mounting board, said release-holding mechanism comprising a pivoted lever having a holding finger normally engageable with the lower-most tile in said magazine to prevent discharge of tiles therefrom, said lever having a second holding finger and being movable to and from a position engaging the second holding finger with the next upwardly disposed tile in said magazine to prevent discharge of other tiles therefrom while releasing the first finger from engagement with said lower-most tile to permit discharge thereof.

5. In apparatus for placing tile bodies in the recesses of a tile mounting board, in combination, means for moving a tile mounting board toward and past a tile depositing station, tile depositing means at said station and disposed above and aligned with the travel path of particular recesses in such mounting board as the latter is moved by said moving means, means for effecting discharge of tile bodies from said depositing means, and actuating means for actuating said means for effecting discharge, said actuating means being coordinated with and controlled by the travel movement of such board when so moved, wherein said actuating means comprises a rotatable drum having a plurality of keys protruding from the periphery thereof, each key corresponding to a respective recess in said mounting board in which a tile body is to be deposited, each key being operable for selective activation and deactivation, and an instrumentality engageable with each activated key and operable to actuate said discharge means to deposit a tile body in said corresponding recess during travel movement of said board, and means for effecting a single revolution of said drum as such tile mounting board is moved to and past said station.

6. Apparatus as in claim 5, wherein the last-mentioned means comprises electric clutch means, and control means operable by said board during travel movement thereof to cause clutching operation of said clutch means.

7. Apparatus as in claim 5, wherein the last-mentioned means comprises brake means for stopping said drum in a predetermined rotative position after each revolution thereof.

8. Apparatus as in claim 5, wherein the last-mentioned means comprises electric clutch means, control means operable by said board during travel movement thereof to cause clutching operation of said clutch means, and brake means for stopping said drum in a predetermined rotative position after each revolution thereof.

9. In apparatus for placing tile bodies in the recesses of a tile mounting board, in combination, means for moving a tile mounting board toward and past a tile depositing station, tile depositing means at said station and disposed above and aligned with the travel path of particular recesses in such mounting board as the latter is moved by said moving means, means for effecting discharge of tile bodies from said depositing means, and actuating means for actuating said means for effecting discharge, said actuating means being coordinated with and controlled by the travel movement of such board when so moved, wherein the tile depositing means comprises a gravity feed magazine, a feed track for said magazine, feeder means for feeding tile bodies successively to said track, means for moving the tile bodies along said track to said magazine, and control means for effecting operation of said feeder means in accordance with the supply of tile bodies in said track.

10. Apparatus as in claim 9, supply means for supplying tile bodies to said feeder means, and control means for regulating operation of said supply means under control of said actuating means.

References Cited
UNITED STATES PATENTS

| | | | |
|---|---|---|---|
| 2,833,095 | 5/1958 | Stuart | 53—246 X |
| 2,834,169 | 5/1958 | Stuart | 53—246 |
| 2,917,591 | 12/1959 | Juhas | 74—568 X |
| 2,968,899 | 1/1961 | Holmes | 53—160 X |

ROBERT C. RIORDON, *Primary Examiner.*

FRANK E. BAILEY, TRAVIS McGEHEE, *Examiners.*

P.H. POHL, R. ALVEY, *Assistant Examiners.*